(12) United States Patent
Jiang et al.

(10) Patent No.: US 11,088,906 B2
(45) Date of Patent: Aug. 10, 2021

(54) DEPENDENCY DETERMINATION IN NETWORK ENVIRONMENT

(71) Applicant: INTERNATIONAL BUSINESS MACHINES CORPORATION, Armonk, NY (US)

(72) Inventors: Peng Hui Jiang, Beijing (CN); Han Lin Wang, Beijing (CN); Jiang Xuan, State College, PA (US); Cheng Xu, Beijing (CN); Hong Mei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/975,857

(22) Filed: May 10, 2018

(65) Prior Publication Data
US 2019/0349255 A1    Nov. 14, 2019

(51) Int. Cl.
*H04L 12/24* (2006.01)
*H04L 29/08* (2006.01)
*H04L 12/751* (2013.01)

(52) U.S. Cl.
CPC .......... *H04L 41/0813* (2013.01); *H04L 41/12* (2013.01); *H04L 45/02* (2013.01); *H04L 67/16* (2013.01)

(58) Field of Classification Search
CPC ..... H04L 41/0813; H04L 41/12; H04L 45/02; H04L 67/16
USPC ....................................................... 709/223
See application file for complete search history.

(56) References Cited

U.S. PATENT DOCUMENTS

| 6,681,389 | B1 | 1/2004 | Engel et al. | |
|---|---|---|---|---|
| 6,756,994 | B1* | 6/2004 | Tlaskal | G06T 15/503 |
| | | | | 345/440 |
| 8,627,199 | B1* | 1/2014 | Handley | G06F 16/957 |
| | | | | 715/234 |
| 8,768,953 | B2* | 7/2014 | Pan | G06F 16/24539 |
| | | | | 707/769 |
| 9,557,879 | B1 | 1/2017 | Wang et al. | |
| 2005/0122995 | A1* | 6/2005 | Meyer | H04L 69/326 |
| | | | | 370/473 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Umar Cheema
*Assistant Examiner* — John Fan
(74) *Attorney, Agent, or Firm* — Caleb D. Wilkes

(57) ABSTRACT

This disclosure provides a computer-implemented method. The method may comprise obtaining a character of first-direction communications and a character of second-direction communications in a network environment, the first-direction communications being network communications from a first node to a second node, and the second-direction communications being network communications from the second node to the first node. The method may further comprise determining a dependency between the first node and the second node based on the character of first-direction communications and the character of second-direction communications, the dependency between the first node and the second node indicating whether the first node depends on the second node or the second node depends on the first node.

19 Claims, 8 Drawing Sheets

(56) References Cited

U.S. PATENT DOCUMENTS

| | | | |
|---|---|---|---|
| 2006/0064690 A1* | 3/2006 | Hamadi | G06N 5/02 718/100 |
| 2007/0297404 A1* | 12/2007 | Boucard | H04L 47/805 370/389 |
| 2008/0075017 A1* | 3/2008 | Kramer | H04L 12/66 370/252 |
| 2008/0222287 A1* | 9/2008 | Bahl | H04L 41/12 709/224 |
| 2010/0029206 A1* | 2/2010 | Kumagai | H04W 8/005 455/41.2 |
| 2010/0189027 A1* | 7/2010 | Ishida | H04W 48/12 370/312 |
| 2013/0227566 A1* | 8/2013 | Higuchi | G06F 9/45533 718/1 |
| 2014/0068040 A1 | 3/2014 | Neti et al. | |
| 2015/0163092 A1 | 6/2015 | Takagi et al. | |
| 2016/0165654 A1* | 6/2016 | Sato | H04W 76/14 370/328 |
| 2016/0255136 A1* | 9/2016 | Gupta | H04L 47/125 709/223 |
| 2017/0163504 A1 | 6/2017 | Tofts et al. | |

* cited by examiner

400

Obtaining a count of first-direction communications and a count of second-direction communications in a network environment, the first-direction communications being network communications from a first node to a second node, and the second-direction communications being network communications from the second node to the first node  S410

Determining a dependency between the first node and the second node based on the count of first-direction communications and the count of second-direction communications  S420

*FIG. 4*

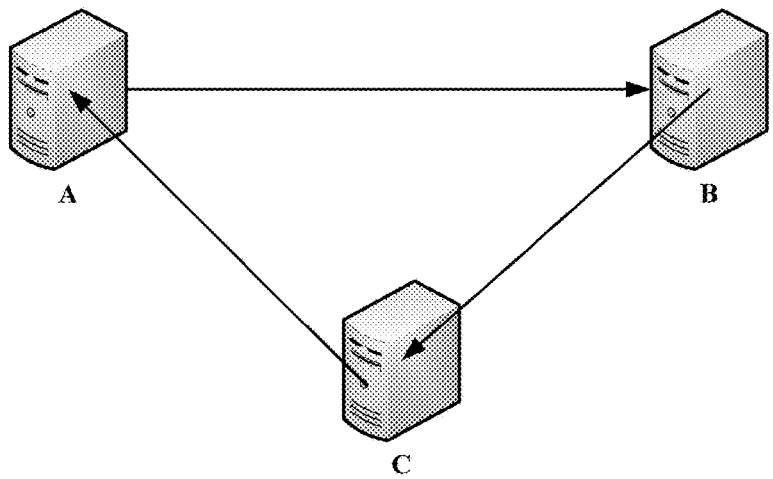

DEPENDENCY DETERMINATION IN NETWORK ENVIRONMENT

BACKGROUND

The present disclosure relates to computer networks, and more specifically, to operations of nodes in a network environment.

In a network environment, there may be different nodes (such as servers, clients, applications, databases, etc.) performing various operations. In some cases, node A may depend on an interaction with node B so as to perform normally, which may indicate that node A depends on node B. For example, a web application may perform normally after accessing a license server to acquire a license for permission of running the web application, which indicates that the web application depends on the license server.

BRIEF SUMMARY

According to an embodiment of the present disclosure, there is provided a computer-implemented method. The method may comprise obtaining a character of first-direction communications and a character of second-direction communications in a network environment, the first-direction communications being network communications from a first node to a second node, and the second-direction communications being network communications from the second node to the first node. The method may further comprise determining a dependency between the first node and the second node based on the character of first-direction communications and the character of second-direction communications.

According to another embodiment of the present disclosure, there is provided a system, which may comprise one or more processors and a memory coupled to at least one of the one or more processors. The system may further comprise a set of computer program instructions stored in the memory and executed by at least one of the one or more processors in order to perform an action of obtaining a character of first-direction communications and a character of second-direction communications in a network environment, the first-direction communications being network communications from a first node to a second node, and the second-direction communications being network communications from the second node to the first node. The system may further comprise a set of computer program instructions stored in the memory and executed by at least one of the one or more processors in order to perform an action of determining a dependency between the first node and the second node based on the character of first-direction communications and the character of second-direction communications.

According to a further embodiment of the present disclosure, there is provided a computer program product. The computer program product may comprise a computer readable storage medium having program instructions embodied therewith. The program instructions may be executable by a device to perform a method. The method may comprise obtaining a character of first-direction communications and a character of second-direction communications in a network environment, the first-direction communications being network communications from a first node to a second node, and the second-direction communications being network communications from the second node to the first node. The method may further comprise determining a dependency between the first node and the second node based on the character of first-direction communications and the character of second-direction communications.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 is a flow chart showing an exemplary computer-implemented method for dependency determination according to an embodiment of the present disclosure.

FIG. 5 is an exemplary graph representation of a dependency cycle according to an embodiment of the present disclosure.

DETAILED DESCRIPTION

Figure 1:
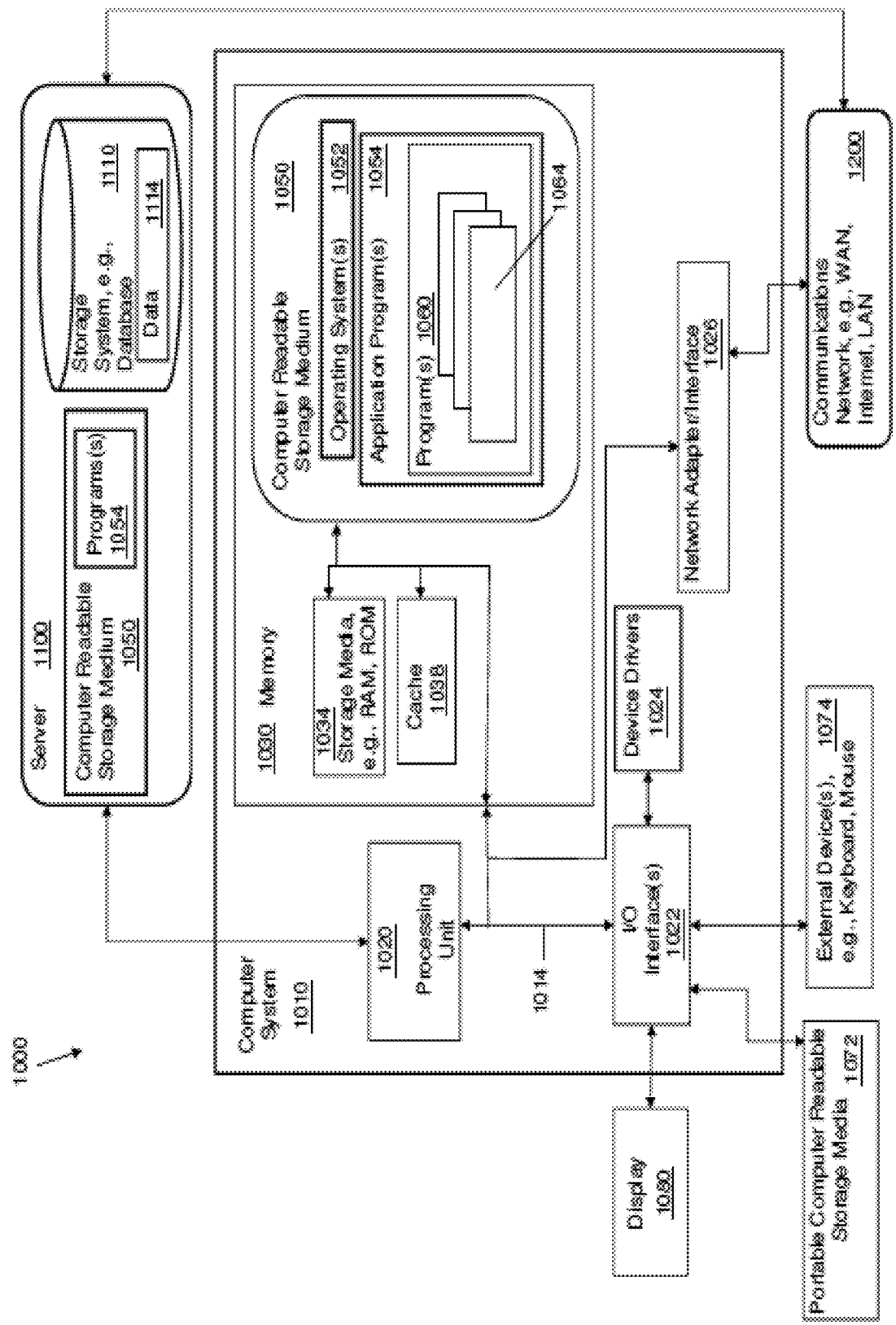
FIG. 1 depicts a cloud computing node according to an embodiment of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Some embodiments of the present invention may include one, or more, of the following features, characteristics, advantages and/or operations: (i) considers all virtual servers in system as a Directed Acyclic Graph (DAG); (ii) monitors all the network traffic within sub-net; (iii) considers each server of distributed system as a node of DAG; (iv) put each node in DAG with specified rules, while the system method is running; (iv) system traverses DAG according to pre-defined rules; (v) user gets the dependency relationship of the whole distributed system with dependency eventually, while there is a virtual server maintenance request; (vi) system can do one, or more of the following: (a) jump to the node which provides the specified service, (b) check the dependency, (c) preform maintenance on the virtual servers following the sequence defined by DAG; (vii) once the maintenance is completed, service starts all the related servers with a revert sequence (this typically follows the DAG as well); (viii) considers virtual server of distributed system as a node in a DAG; (ix) determine and validate the relationship dependency according to the predefined rules and network access number; (x) adjusts threshold to stabilize relationship dependency; (xi) runs and maintains virtual servers according to a sequence related to nodes recorded in the DAG; (xii) recognizes that the dependency of virtual server can be changed frequently due to complicated network transmit; (xiii) uses network traffic count number and a threshold to stabilize the dependency, so the dependency can be changed dynamically; (xiv) stores the dependencies in a Directed Acyclic Graph, which can provide direction of dependency, and avoid cycle dependency in most of general architecture; (xv) uses a DAG instead of, or in addition to, a dependency graph; (xiv) monitors the data transmit of network, counts the traffic number with direction of related servers, then leverages a threshold to stabilize the dependency; (xv) can start from any node in DAG; (xvi) DAG can avoid cycle dependency in most of general distributed architecture which a graphical representation cannot; (xvii) introduces a software system service running on any nodes of a distributed system, focusing on generate the dependency relationship automatically by monitoring the network traffic count with direction, and stores the relationship to a Directed Acyclic Graph; and/or (xviii) considers dependency changes and cycle dependencies.

Referring now to FIG. 1, a schematic of an example of a cloud computing node is shown. A system 1000 includes a computer system or computer 1010 shown in the form of a generic computing device. The methods 400, 600 and 900, for example, may be embodied in a program(s) 1060 (FIG. 1) embodied on a computer readable storage device, for example, generally referred to as memory 1030 and more specifically, computer readable storage medium 1050 as shown in FIG. 1. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 1 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 1 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 1, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 400, 600 and 900 (FIGS. 4, 6, and 9), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network 1200 may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
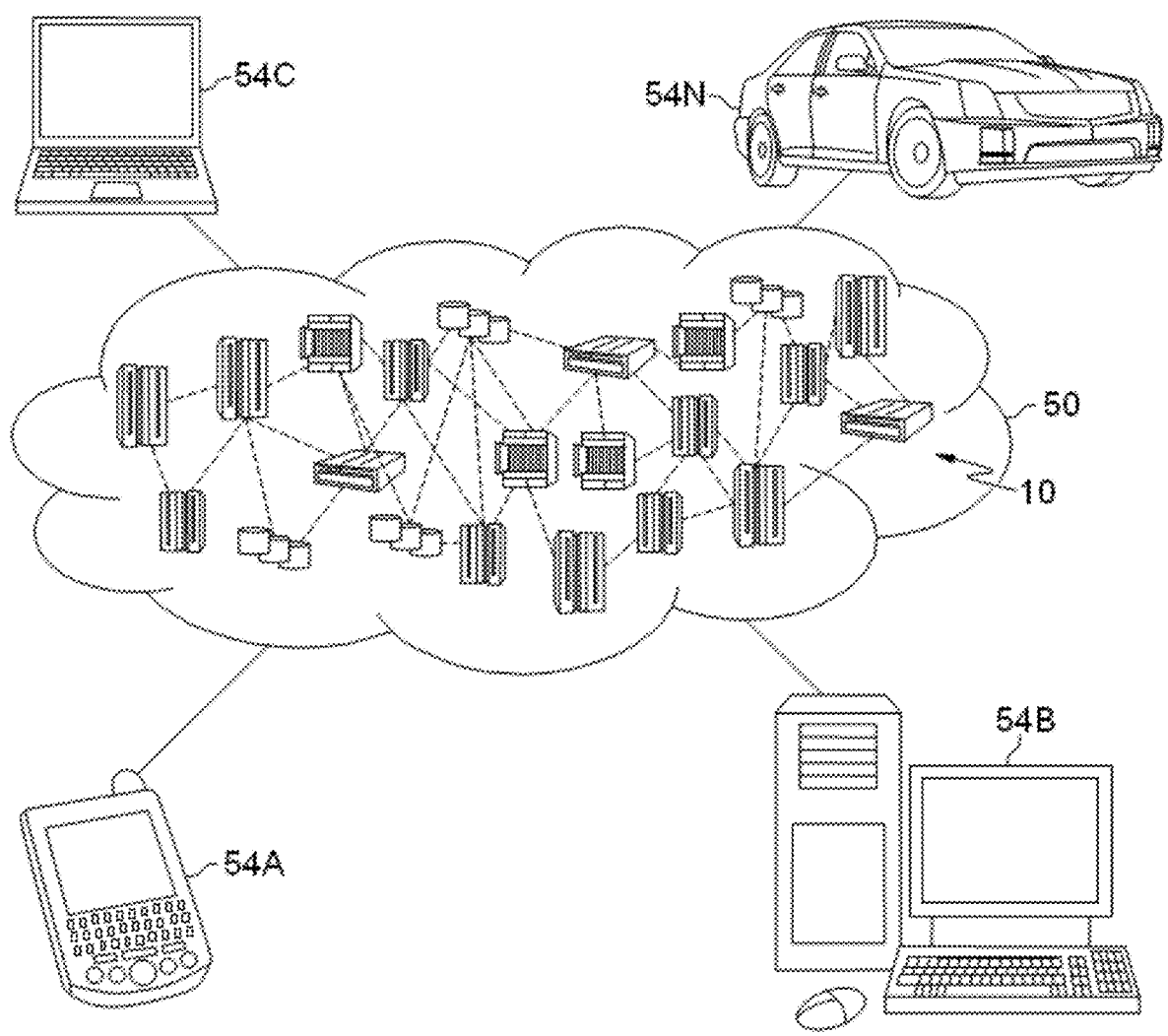
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
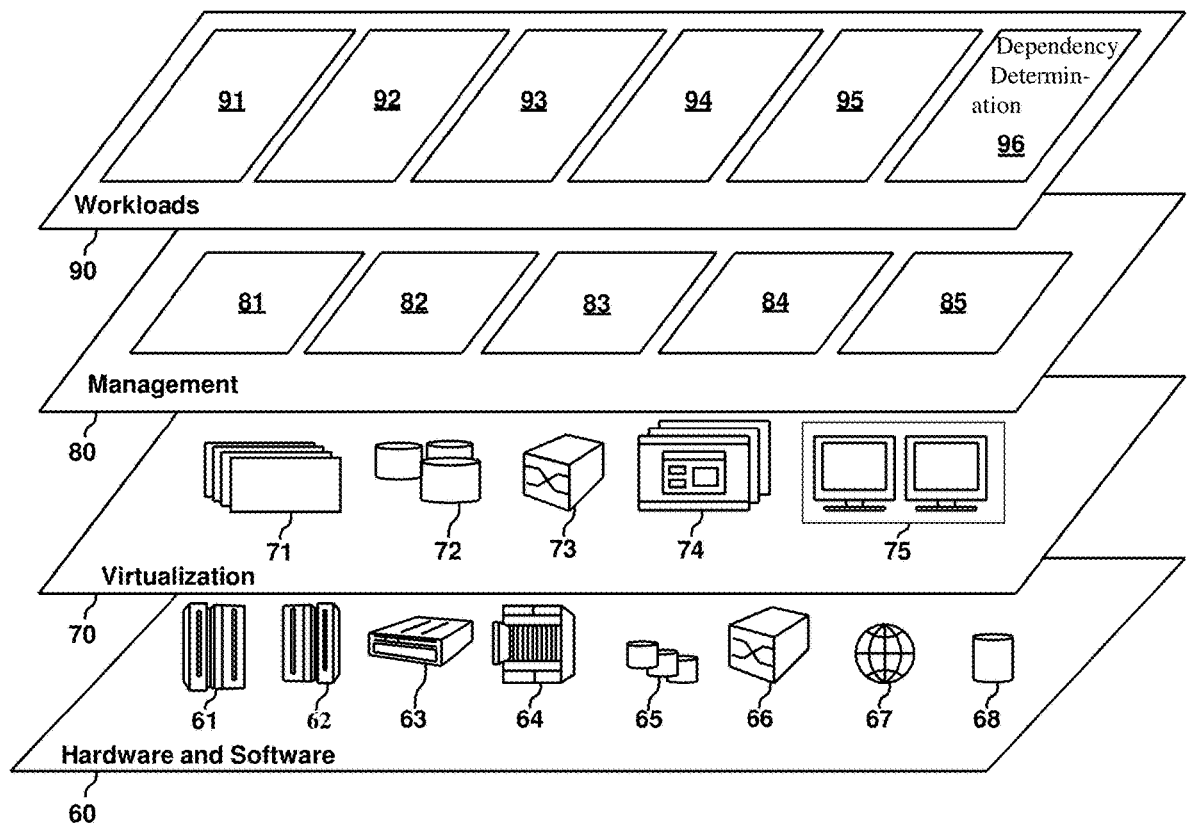
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dependency determination 96.

Some embodiments of the present disclosure may be implemented as the program/utility 40 or the program modules 42 of the computer system/server 12 of FIG. 1, or as the dependency determination 96 of the workloads layer 90 of FIG. 3.

In the following, some exemplary methods for determining dependencies between nodes in a network environment according to embodiments of the present disclosure will be described.

In a network environment, there may be two nodes, i.e., node A and node B, having dependency therebetween. Each of node A and node B may be a server, a client, an application, a database and so on. As an example, node A and node B may be a web application and a license server respectively. The web application accesses the license server to acquire a license for running the web application, which indicates that the web application depends on the license server. As another example, node A and node B may be a client and a database respectively. The client accesses the database to acquire data for supporting the operation of the client, which indicates that the client depends on the database. The dependency between node A and node B may affect operations of the two nodes. Therefore, it may be advantageous to determine the dependency between the two nodes in the network environment.

The inventors of the present disclosure have found that although there may be various data transmissions between node A and node B, characters of communications in different directions between node A and node B (i.e., communications from node A to node B and communications from node B to node A) may be used to reflect the dependency indicating whether node A depends on node B or node B depends on node A. A character of communications may be at least one of a count of the communications, traffic of the communications, transmission data volume of the communications, and any other information related to the communications. A count of the communications may comprise at least one of a count of requests, a count of sessions, a count of packets, etc. For example, if node A depends on node B, a count of requests sent from node A to node B is usually more than a count of requests sent from node B to node A. As another example, if node A depends on node B, traffic transmitting from node A to node B may be more than traffic transmitting from node B to node A. Therefore, according to an exemplary embodiment of the present disclosure, a dependency between node A and node B may be determined based on the character of communications from node A to node B and the character of communications from node B to node A.

In the following description, the count of communications may be used as an exemplary character of communications. However, it should be appreciated that other character of communications (e.g., traffic of the communications, transmission data of the communications and other information related to the communications) may be appropriate for the embodiments of the present disclosure.

Referring now to FIG. 4, which is a flow chart showing an exemplary computer-implemented method 400 for dependency determination according to an embodiment of the present disclosure.

As shown in FIG. 4, the method 400 may comprise a count obtaining step S410 and a dependency determining step S420.

In step S410, a count of first-direction communications and a count of second-direction communications in a network environment may be obtained. The first-direction communications may be network communications from a first node to a second node, and the second-direction communications may be network communications from the second node to the first node.

In step S420, a dependency between the first node and the second node may be determined based on the count of first-direction communications and the count of second-direction communications obtained by step S410. The dependency between the first node and the second node may indicate whether the first node depends on the second node or the second node depends on the first node.

The network environment described in the present disclosure may be of any type, e.g., a distributed network environment or a cloud environment (e.g., the cloud computing environment 50 described with reference to FIG. 2). Further, the network environment may be a private sub network (such as a local area network (LAN)) in which all nodes are controlled by a same router and communications between two nodes are broadcasted to all other nodes in the network environment.

The node described in the present disclosure (e.g., the first node or the second node) may be any physical or virtual machine operating in the network environment. Some examples of the node include a server, a client, a database, an application, a storage device, a software component, a network hardware, a combination thereof, and the like. Further, the cloud computing node 10 described with reference to FIGS. 1~2 may correspond to the node of the present disclosure.

Further, although described are two nodes, that is, the first node and the second node in the network environment, involved in the method 400 of FIG. 4, it should be appreciated that the method 400 can be applied to a case in which more than two nodes are interacting in the same network environment. For example, it may be determined according to the computer-implemented method 400 of the present disclosure that the first node not only depends on the second node, but also depends on one or more other nodes different from the second node. Further, according to the method 400, the dependency between any two of the nodes in the network environment may be determined.

The network communication may be a network request or any other network communication in the network environment. The network request may be an access request, a query request, an invocation request, etc. In some embodiments, the first-direction communication may be a network request from the first node to the second node, and the second-direction communication may be a network request from the second node to the first node.

The first-direction communication and the second-direction communication are communications with reverse directions between the first node and the second node. In some embodiments, the first-direction communications may include a direct network communication from the first node directly to the second node, without going through any intermediate nodes between the first node and the second node. Further, the counts of first-direction communications may be determined by the number of times that the first-direction communications have been captured.

In other embodiments, the first-direction communications may also include an indirect network communication from the first node to the second node via one or more intermediate nodes. Thus, the counts of the first-direction communications may be a sum of counts of direct and indirect communications from the first node to the second node. Similarly, the second-direction communications may include a direct network communication and/or an indirect network communication.

It can be seen from the above, according to the method 400, the count of first-direction communications and the count of second-direction communications are considered in determining the dependency between the first node and the second node. As described in the aforementioned, the counts may reflect the dependency indicating whether the first node depends on the second node or the second node depends on the first node more accurately. In this way, the dependency may be determined to conform to the actual dependency between the first node and second node in the network environment.

More details of method 400 will be described below.

In some embodiments, in the count obtaining step S410, the count of the first-direction communications and the count of the second-direction communications may be obtained based on a capture of a communication. For example, it is possible to update and obtain the count of the first-direction communications and/or the count of the second-direction communications every time a new communication is captured between the first and second nodes. The communications may be captured by any existing methods in the prior art. In some embodiments, in a case where the network environment corresponds to a private sub network, the first-direction communications and the second-direction communications may be captured by virtual routing and forwarding (VRF), by which all communications broadcasted in the private sub network may be captured.

In some embodiments, the counts may be stored in a table. The following Table 1 shows an exemplary table for storing counts, wherein node A and node B are examples of the first node and the second node respectively, communication A→B corresponds to the first-direction communication, and communication B→A corresponds to the second-direction communication.

In some embodiments, the dependency determined in the dependency determining step S420 may also be stored in the table or in another data structure. For example, Table 1 shows the determined dependency indicating that node A depends on node B, which may be determined, in an example, based on the count "50" of communications A→B prevailing over the count "30" of communications B→A. In some embodiments, the dependency may be represented by a graph such as DAG (Directed Acyclic Graph). Examples of such graph representation of the dependency can be found in FIGS. 5, 7A~7B and 8A~8B, in which, for example, a solid arrow drawn from node A to node B represents a dependency indicating that node A depends on node B.

TABLE 1

| Communication | A→B | B→A |
|---|---|---|
| Count | 50 | 30 |
| Dependency | A depends on B | |

In some embodiments, in the count obtaining step S410, in response to a capture of a first-direction communication, the count of first-direction communications may be increased by one. Similarly, in response to a capture of a second-direction communication, the count of second-direction communications may be increased by one. Further, in the dependency determining step S420, the dependency may be determined based on the increased count of first-direction communications and/or the increased count of second-direction communications.

In some embodiments, the dependency determining step S420 may be performed in response to each capture of the first-direction communication or the second-direction communication, in which case the count used for the determination may be increased by one based on each capture. In other embodiments, the dependency determining step S420 may be performed in response to several captures of the first-direction communications and/or the second-direction communications, in which case the counts used for the determination may be increased based on the several captures.

In some embodiments, the dependency determining step S420 may comprise an update determining step of determining whether the dependency between the first node and the second node is to be updated.

Updating the dependency may correspond to the following two cases, depending on whether the dependency between the first node and second node already exists or not. Specifically, in the first case where there is no existing dependency between the first node and the second node, updating the dependency may comprise setting a dependency between the first node and the second node. The first case may occur if the dependency between the first node and the second node is not yet determined for the first time, or if the dependency between the first node and the second node was abandoned, which may be described in detail subsequently with reference to FIGS. 8A and 8B. Further, in a second case where the dependency already exists between the first node and the second node, updating the dependency may comprise reversing the existing dependency between the first node and the second node. In either case, whether the dependency is to be updated may be determined based on a relationship between the count of first-direction communications and the count of second-direction communications.

In some embodiments, the relationship between the count of first-direction communications and the count of second-direction communications may be indicated by a determination of whether the count of first-direction communications prevails over the count of second-direction communications. For example, if the count of first-direction communication is larger than the count of the second-direction communication, it may be determined that the count of first-direction communications prevails over the count of second-direction communications. However, it should be appreciated that the prevailing of the count of communications (or other character of communications) may be determined based on other criteria. Further, the relationship may be in any other forms predetermined according to actual needs.

More details of the update determining step will be described below.

According to some embodiments of the present disclosure, the update determining step may be implemented based mainly on two rules, the one is to update the dependency based on the prevailing of the count of first-direction communications and the count of second-direction communications, and the other is to avoid a dependency cycle. Either or both of the two rules may be reflected in the following description of the updating determining step.

In the first case where there is no existing dependency between the first node and the second node, in the update determining step, a dependency is set to indicate that the first node depends on the second node if the count of first-direction communications prevails over the count of second-direction communications.

For example, as shown in Table 2A, there is no existing dependency between node A and node B (shown as "None" in Table 2A). Further, the communication A→B is captured and the count of communications A→B is increased by one as "50" as shown in Table 2B. Therefore, the count "50" of communications A→B is larger than the count "30" of communications B→A, which indicates that the count of communications A→B prevails over the count of communications B→A. In this case, a dependency indicating that node A depends on node B is thus set as an updated dependency, as shown in Table 2B.

TABLE 2A

| Communication | A→B | B→A |
|---|---|---|
| Count | 49 | 30 |
| Dependency | None | |

TABLE 2B

| Communication | A→B | B→A |
|---|---|---|
| Count | 50 | 30 |
| Dependency | A depends on B | |

In the first case where there is no existing dependency between the first node and the second node, there is a situation that neither of the count of first-direction communications and the count of first-direction communications prevails over the other. For example, the count of communications A→B is 49 as shown in Table 3A, and then the communication A→B is captured and the count of communications A→B is increased by one as "50" as shown in Table 3B. Therefore, the count "50" of communications A→B becomes equal to the count "50" of communications B→A, as shown in Table 3B.

In this situation, in the update determining step, a dependency is set to indicate that the first node depends on the second node if the latest counted communication is a first-direction communication.

For example, as shown in Tables 3A and 3B, since the count of communications A→B is recently increased from "49" to "50", i.e., the latest counted communication is the communication A→B, a dependency indicating that node A depends on node B is set as an updated dependency.

TABLE 3A

| Communication | A→B | B→A |
|---|---|---|
| Count | 49 | 50 |
| Dependency | None | |

TABLE 3B

| Communication | A→B | B→A |
|---|---|---|
| Count | 50 | 50 |
| Dependency | A depends on B | |

In the second case where the dependency between the first node and the second node already exists, in the updating determining step, it is determined whether to reverse the existing dependency or not.

Specifically, in the second case, in a situation where an existing dependency indicates that the second node depends on the first node, the dependency may be reversed if the count of first-direction communications prevails over the count of second-direction communications.

For example, as shown in Table 4A, there is an existing dependency indicating that node B depends on node A. Further, the communication A→B is captured and the count of communications A→B is increased by one as "51" as shown in Table 4B. Therefore, the count "51" of A→B becomes larger than the count "50" of B→A, which indicates that the count of A→B prevails over the count of B→A. In this situation, the dependency indicating that node B depends on node A as shown in Table 4A may be reversed to indicate that node A depends on node B as shown in Table 4B.

TABLE 4A

| Communication | A→B | B→A |
|---|---|---|
| Count | 50 | 50 |
| Dependency | B depends on A | |

TABLE 4B

| Communication | A→B | B→A |
|---|---|---|
| Count | 51 | 50 |
| Dependency | A depends on B | |

Further, in the second case, in a situation where an existing dependency indicates that the first node depends on the second node, the dependency may not be reversed if the count of first-direction communications prevails over the count of second-direction communications. For example, if the communication A→B is captured again and the count of communications A→B is increased by one as "52", the dependency indicating that node A depends on node B as shown in Table 4B may be retained without being reversed.

In the examples described with reference to Tables 2A~4B, whether the count of A→B prevails over the count of B→A is indicated based on a comparison of whether the count of communications A→B is larger than the count of communications B→A. However, it should be appreciated that whether the count of communications A→B prevails over the count of communications B→A may be determined based on other criteria. In some embodiments, it is determined that the count of first-direction communications prevails over the count of second-direction communications if the count of first-direction communications is larger than the count of second-direction communications by a margin which is not smaller than a predefined threshold.

The predefined threshold may be determined based on an actual condition of the network environment, e.g. types of the nodes, how often the first-direction communications and the second-direction communication occur, etc.

In some embodiments, the predefined threshold may be a constant number N, where N may be an integer equal to or larger than 1. In these embodiment, for example, the count $C_{A \to B}$ of communications A→B prevails over the count $C_{B \to A}$ of communications B→A in a case where $C_{A \to B} - C_{B \to A} \geq N$, and $C_{B \to A}$ prevails over $C_{A \to B}$ in a case where $C_{B \to A} - C_{A \to B} \geq N$. If the predefined threshold N=1, the count $C_{A \to B}$ of communications A→B prevails over the count $C_{B \to A}$ of communications B in a case where $C_{A \to B}$ is larger than $C_{B \to A}$, which may correspond to the examples described above with reference to Tables 2A~4B.

In some embodiments, the predefined threshold may be a linear or non-linear function F of the count $C_{A \to B}$ of first-direction communications and/or the count $C_{B \to A}$ of second-direction communications. For example, the function may be $F = T \times C_{B \to A}$, wherein T is a constant value, e.g., 10%. The count $C_{A \to B}$ of communications A→B prevails over the count $C_{B \to A}$ of communications B in a case where $C_{A \to B} - C_{B \to A} \geq 10\% \times C_{B \to A}$. Similarly, $C_{B \to A}$ prevails over $C_{A \to B}$ in a case where $C_{B \to A} - C_{A \to B} \geq 10\% \times C_{A \to B}$.

If the predefined threshold is larger than 1, there may be many cases in which neither of $C_{A \to B}$ and $C_{B \to A}$ prevails over the other one even if $C_{A \to B}$ and $C_{B \to A}$ have small differences, and any existing dependency may remain unchanged if such cases happen. Therefore, the result of whether $C_{A \to B}$ prevails over $C_{B \to A}$ or $C_{B \to A}$ prevails over $C_{A \to B}$ will not change so frequently compared to the case where the predefined threshold equals to 1. As a result, in a case where the predefined threshold is larger than 1, the dependency may not be reversed too frequently, so that the dependency may be stabilized by properly defining the predefined threshold.

According to the present disclosure, the dependency between the first node and the second node may be determined as either the first node depending on the second node or the second node depending on the first node. Therefore, a co-existence of a dependency indicating that the first node depends on the second node and a dependency in a reverse direction, i.e., the second node depending on the first node may be avoided. Therefore, even if there is co-existence of communications from the first node to the second node and communications from the second node to the first node, the dependency may be determined properly. For example, even if a data transmission from the license server to the web application is monitored, the dependency between the web application and the license server may still be determined as the web application depending on the license server in a case where the counts of communications from the web application to the license server prevails over the counts of communications from the license server to the web application. Therefore, an interference of data transmission with a low frequency (e.g., the data transmission from the license server to the web application) for determining the dependency may be decreased, and thus the dependency may be determined more accurately to reflect the actual dependency in the network environment.

On the other hand, in a case where the dependency indicating that the first node depends on the second node co-exists with a dependency chain in a reverse direction, i.e., the second node indirectly depends on the first node via one or more intermediate nodes, a "dependency cycle" between the first node and the second node may be caused.

FIG. 5 shows an exemplary dependency cycle between node A and node B, in which the dependencies are represented by a graph. As shown in FIG. 5, the arrow from node A to node B indicates that node A depends on node B. Further, there are dependencies between node B and node C and between node C and node A as indicated by the other arrows in FIG. 5.

As can be seen from FIG. 5, a dependency chain B→C→A is presented, which indicates that node B indirectly depends on node A via an intermediate node C. Therefore, the co-existence of the dependency A→B and the dependency chain B→C→A constructs a dependency cycle, which starts at node A and loops back to node A along a same direction via node B and node C.

In some embodiments, in the dependency determining step S420 of the method 400, the dependency may be determined in consideration of avoiding the dependency cycle. Specifically, the update determining step may determine whether the dependency between the first node and the second node is to be updated so as to avoid the co-existence of the dependency indicating that the first node depends on the second node and a dependency chain indicating that the second node indirectly depends on the first node via one or more intermediate nodes.

In the following description, the dependency between the first node and the second node without intermediate nodes is also referred to as direct dependency, so as to be distinguished from the dependency chain. Further, the dependency indicating that the first node depends on the second node may be in association with the count of communications from the first node to the second node. Specifically, the direct dependency indicating that node A depends on node B may be associated with the count $C_{A \to B}$ of communications from node A to node B. Further, the dependency chain B→C→A may be associated with a sum of counts of communications from node B to node A via node C.

It should be appreciated that the dependency cycle may be in other forms different from that shown in FIG. 5, as long as the dependency cycle starts at one node and follows consistently-directed dependencies via one or more intermediate nodes and eventually loops back to the same node. The dependency cycle in other forms may also be avoided according to some embodiments of the present disclosure.

Figure 6:
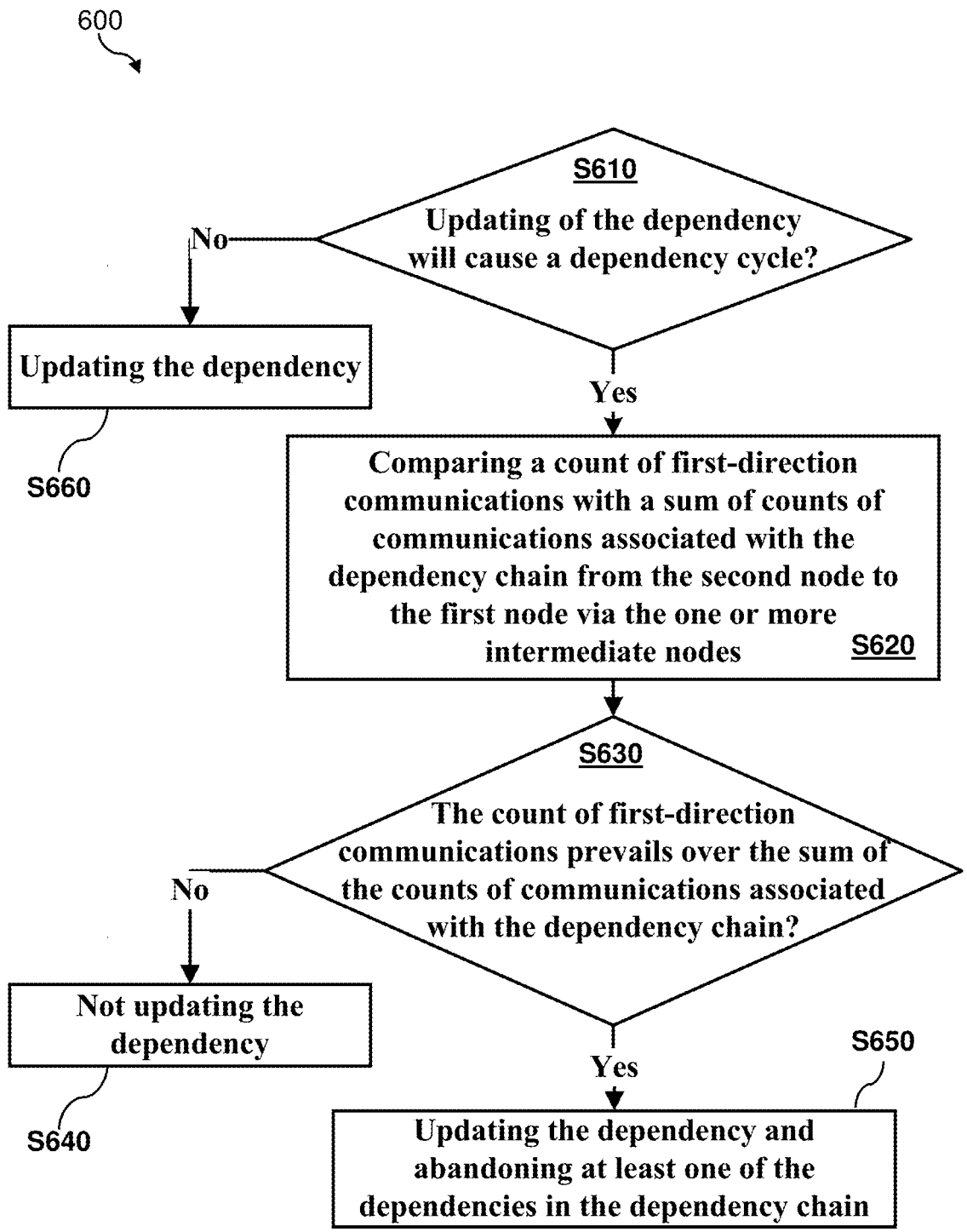
FIG. 6 is a flow chart showing an exemplary method for avoiding the dependency cycle according to an embodiment of the present disclosure.

An exemplary method 600 for avoiding the dependency cycle according to an embodiment of the present disclosure will be described with reference to FIGS. 6~8B, wherein FIG. 6 is a flow chart of the method 600, FIGS. 7A~8B are exemplary graph representations of the dependency between node A and node B in which a dependency cycle is avoided.

As shown in FIG. 6, in step 610, it is determined whether updating of the dependency between the first node and the second node will cause the dependency cycle, i.e., the co-existence of the dependency indicating that the first node depends on the second node and a dependency chain indicating that the second node indirectly depends on the first node via one or more intermediate nodes.

Figure 7A:
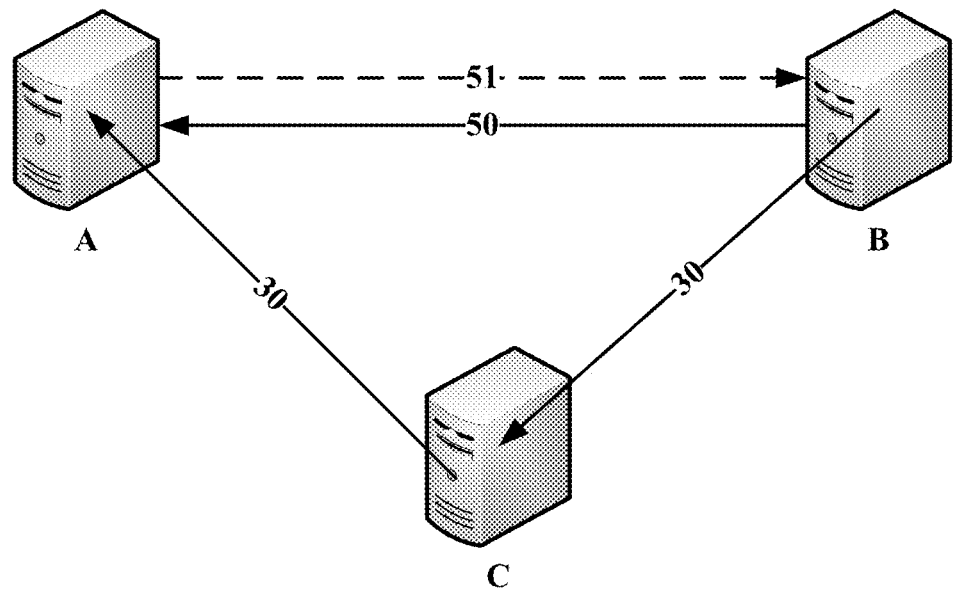
FIGS. 7A and 7B are exemplary graph representations of the dependency according to an embodiment of the present disclosure.

FIG. 7A shows an exemplary determination process of step S610. In FIG. 7A, the solid arrows indicate the existing dependencies, i.e., a direct dependency B A indicating node B directly depends on node A, and a dependency chain B→C→A indicating node B indirectly depends on node A via an intermediate node C. Further, the counts of communications along directions of respective arrows are also represented in the graph. Specifically, the count of communications B→A is "50", the count of communications B→C is "30" and the count of communications C→A is "30". It should be appreciated that in some embodiments, the counts may not be represented in the graph representation of dependency, but may be stored in the table described above or in another data structure, and the counts may be obtained from the table or the data structure when necessary.

The dashed arrow shown in FIG. 7A represents the dependency as a result of a potential update which indicates node A depends on node B, since the count of communications A→B is "51", which becomes prevailing over the count "50" of communications B→A.

In the description of FIGS. 6~8B, the criterion for determining the prevailing of $C_{A \to B}$ and $C_{B \to A}$ is that whether $C_{A \to B}$ is larger than $C_{B \to A}$ (i.e., the predefined threshold N=1). However, it should be appreciated that other criteria threshold may also be applied.

In the case of FIG. 7A, updating the dependency A→B may cause a co-existence of the dependency A→B and the dependency chain B→C→A and thus constitutes a dependency cycle ("Yes" in step S610). Therefore, the method 600 proceeds to step S620.

On the other hand, if it is determined in step S610 that updating the dependency may not cause a dependency cycle ("No" in step S610), the method 600 proceeds to step S660 in which the dependency is updated.

In step S620, the count of first-direction communications is compared with a sum of counts of communications associated with the dependency chain from the second node to the first node via the one or more intermediate nodes.

The communications associated with the dependency chain denote communications with the same starting and ending nodes and with the same direction as the dependency chain. For example, the communications associated with the dependency chain B→C→A shown in FIG. 7A may be the communications of B→C and C→A. Further, the sum $S_{B \to A}$ of the counts of communications associated with the dependency chain may be $C_{B \to C} + C_{C \to A} = 30 + 30 = 60$.

In step S630, it is determined whether the count of first-direction communications, e.g., $C_{A \to B}$ prevails over the sum of the counts of communications associated with the dependency chain, e.g., $S_{B \to A}$. For the case of FIG. 7A, $C_{A \to B} = 51$ does not prevail over $S_{B \to A} = 60$ ("No" in step S630), thus the method 600 proceeds to step S640.

Figure 7B:
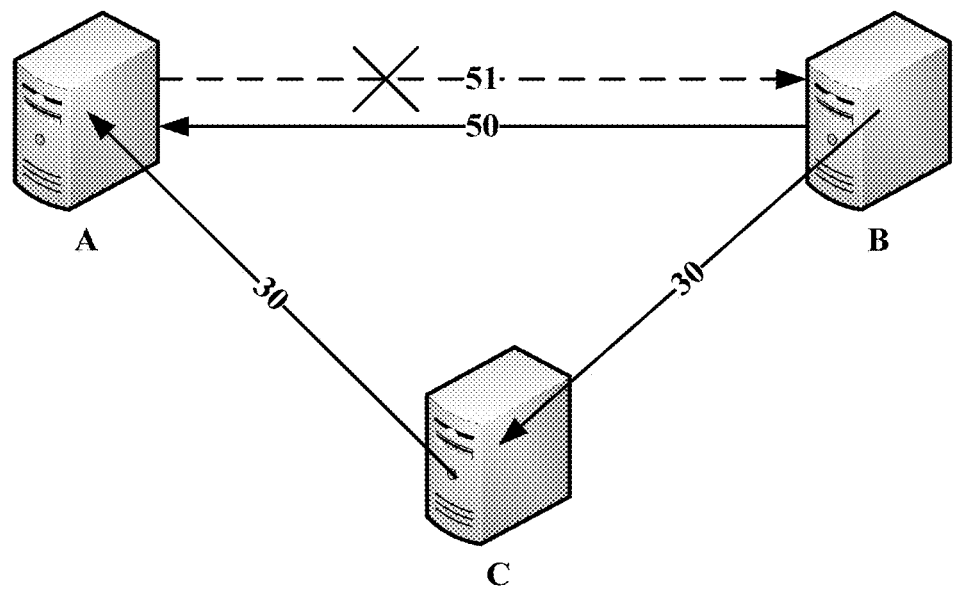

In step S640, it is determined not to update the dependency. For example, as shown in FIG. 7B, the update is not performed, the dependency represented by the dashed arrow indicating that node A depends on node B is not adopted, and the existing dependency B→A and the existing dependency chain B→C→A remain unchanged. Therefore, the dependency cycle which would have been potentially caused by the update, i.e., the co-existence of the direct dependency A→B and the dependency chain B→C→A, may be avoided.

Figure 8A:
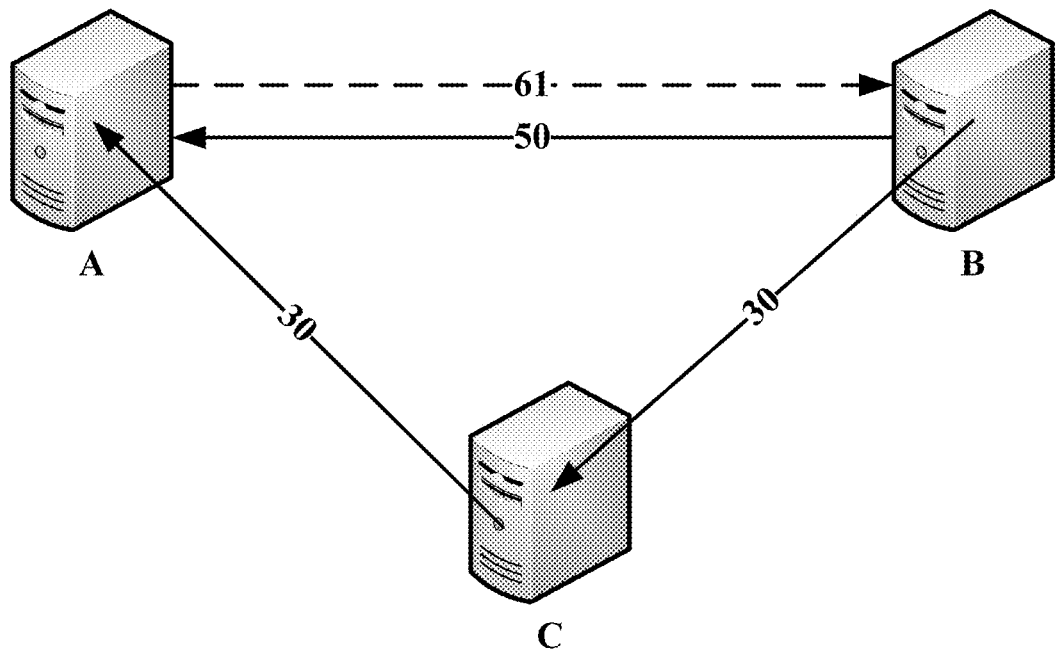
FIGS. 8A and 8B are exemplary graph representations of the dependency according to another embodiment of the present disclosure.

FIG. 8A shows another exemplary determination branching of step S630. FIG. 8A differs from FIG. 7A in that the count of communications A→B in FIG. 8A is "61".

In the case of FIG. 8A, updating the dependency from B→A to A→B will cause a dependency cycle, i.e., a co-existence of the dependency A→B and the dependency chain B→C→A ("Yes" in step S610). Therefore, the method 600 proceeds to step S620.

In step S620, the count $C_{A \to B}$ of communications A→B associated with the dependency A→B is compared to the sum $S_{B \to A}$ of the counts of communications associated with the dependency chain B→C→A. In step S630, it is determined that $C_{A \to B}$=61 prevails over $S_{B \to A}$=60 ("Yes" in step S630), thus the method proceeds to step S650.

Figure 8B:
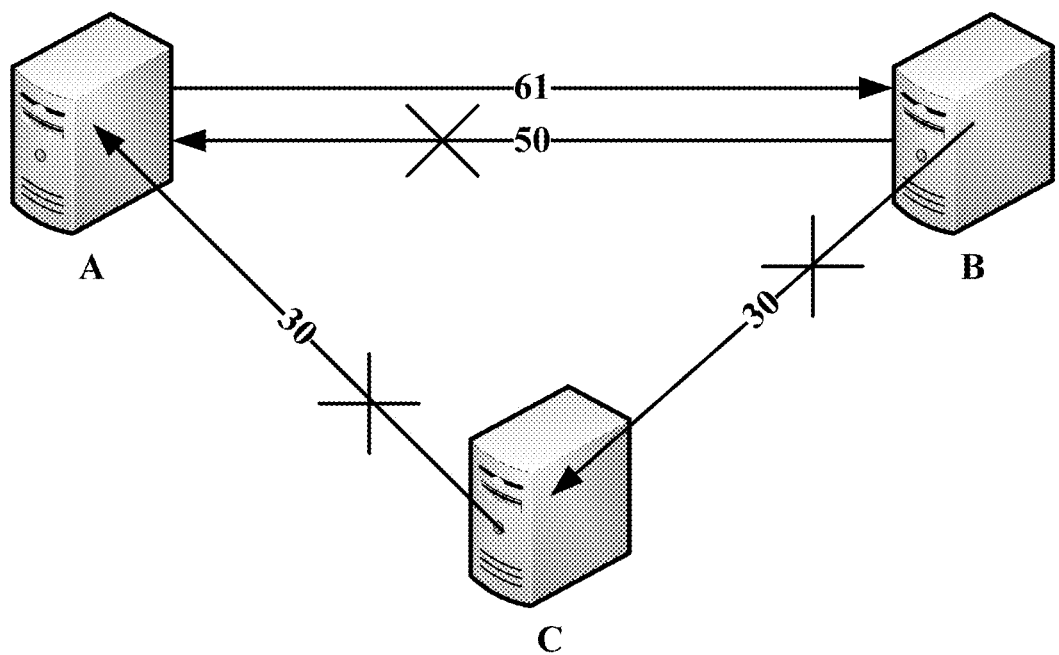

In step S650, it is determined to update the dependency and abandon at least one of the dependencies in the dependency chain. For example, an edge associated with a smallest count of communications in the dependency chain may be abandoned. That is, it is possible to abandon only the dependency B→C or the dependency C→A in FIG. 8B. Alternatively, as shown in FIG. 8B, the dependency chain B→C→A may be abandoned and the dependency between node A and node B is updated as node A depending on node B. Therefore, the dependency cycle which would have been potentially caused by the update, i.e., the co-existence of the direct dependency A→B and the dependency chain B→C→A, may be avoided.

It should be appreciated that in step S650, although at least one of the dependencies in the dependency chain is abandoned for avoiding the dependency cycle, the counts of communication associated with the dependency chain are not abandoned and may still be used in determining the dependency in future processes.

In some embodiments, if it is determined in step S610 that updating the dependency from B→A to A→B will cause a dependency cycle, i.e., a co-existence of the dependency A→B and the dependency chain B→C→A ("Yes" in step S610), a step of breaking the dependency cycle may be performed, as an alternative to steps S620~S650, by abandoning at least one dependency among the dependency cycle. For example, an edge associated with a smallest count of communications in the dependency cycle (e.g., the dependency B→C or the dependency C→A in FIGS. 7A~8B) may be abandoned. By performing the step of breaking the dependency cycle, the comparison in step S620 may be omitted, and the dependency cycle may also be avoided.

It can be seen from the above, according to the method 600, the dependency cycle constructed by the co-existence of the dependency A→B and the dependency chain B→C→A may be avoided. Further, the one with a prevailing count between the dependency A→B and the dependency chain B→C→A will be retained. The retained dependency may reflect the actual dependency more accurately. The dependency between node A and node B with only a single direction (i.e., without a dependency cycle) may facilitate a consistency of dependencies of nodes in the network environment. Therefore, during an operation based on the determined dependencies in the network environment, a consistent rule may be followed so as to avoid potential conflict.

In some embodiments, in a case where the dependency as a result of a potential update already exists between node A and node B, no action may be performed and the dependency may be kept unchanged. In some embodiments, in a case where the dependency between node A and node B is updated, the dependencies between node A (or node B) and other nodes in the network environment may be kept unchanged.

As described in the above, FIGS. 7A~8B show exemplary graph representations of the dependency between nodes in the network environment. An implementation of the graph representation according to the present disclosure may be a Directed Acyclic Graph (DAG). DAG is a directed graph with no directed cycles, which consists of a plurality of vertices and edges, with each edge directed from one vertex to another, so that there is no way to start at any vertex V and follow a consistently-directed sequence of edges that eventually loops back to the vertex V again. The DAG with no directed cycles is suitable to represent the dependency according to the present disclosure in which a dependency cycle is avoided.

In some embodiments, the first node and the second node in the network environment may be represented as a first vertex and a second vertex in the DAG respectively. Further, the dependency indicating that the first node depends on the second node may be represented as an edge directed from the first vertex to the second vertex in the DAG, and the dependency indicating that the second node depends on the first node may be represented by an edge directed from the second vertex to the first vertex in the DAG.

For convenience, in the following description, the vertices in the DAG are also referred to as nodes in the DAG, each node in the DAG corresponds to a node in the network environment.

In an edge directed from node A and node B, node A is referred to as a parent node and node B is referred to as a child node. Further, the edge directed from node A to node B indicates that node A depends on node B. In the following description, an edge A→B also indicates a dependency A→B. A root node in the DAG is a node without a parent node. The root node may be regarded as the least important node in the DAG since no node is depended on the root node. Further, a leaf node in the DAG is a node without a child node. The leaf node may be regarded as the most important node in the DAG since all nodes connected to the leaf node depend on the leaf node and the leaf node does not depend on any node.

Further, it should be appreciated that the DAG is only an exemplary implementation of the graph representation of the dependency. Other graphs may also be used to represent the dependency according to some embodiments of the present disclosure.

Figure 9:
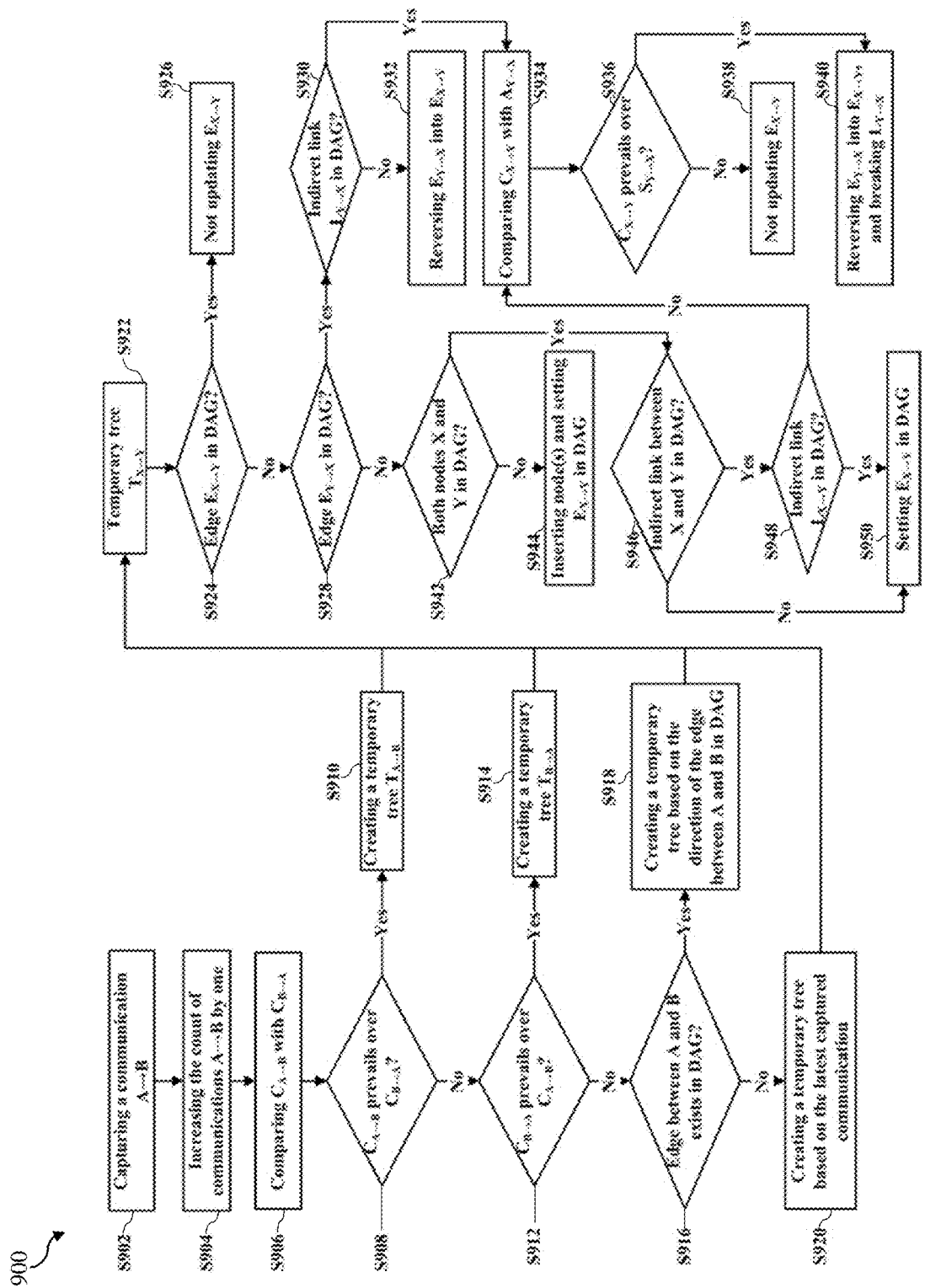
FIG. 9 is a flow chart showing an exemplary computer-implemented method for dependency determination according to an embodiment of the present disclosure.

Now refer to FIG. 9, which is a flow chart showing an exemplary computer-implemented method 900 for dependency determination according to an embodiment of the present disclosure. The method 900 is an exemplary implementation of the method 400 in which the dependency is represented by a DAG.

The method 900 may run on any node in the network environment. The node running the method 900 may be represented in the DAG as a root node. In some embodiments, a node with a less importance in the network environment may be used to run the method 900.

In the method 900, steps S902~S920 relate to determination of a temporary tree T for use in a potential update of the dependency between node A and node B, the temporary tree T indicating a dependency between node A and node B based on the count $C_{A \to B}$ of communications A→B and the count $C_{B \to A}$ of communications B→A. The temporary tree T may indicate the dependency for the potential update as represented by dashed arrows in FIGS. 7A and 8A. Further, steps S922~S950 relate to decision of whether the dependency between node A and node B in the DAG is to be updated based on the temporary tree T. The method 900 is implemented based mainly on two rules, the one is to update the dependency based on the prevailing of $C_{A \to B}$ and $C_{B \to A}$, and the other is to avoid the dependency cycle in the DAG. The details of the method 900 will be described below.

In step S902, a communication A→B is captured. In some embodiments, Internet Protocol (IP) addresses of node A and node B may be obtained from the captured communication. Further, unique IDs (UIDs) of node A and node B may be extracted from the IP addresses of node A and node B respectively and recorded in the DAG, so that each UID may correspond to a unique node in the network environment.

In step S904, the count of communications A→B is added by one. In some embodiments, in step S904, in a case where the communication A→B does not exist in the table used for storing the count, it can be considered that the count of communications A→B is zero, and adding the count of communications A→B by one may be considered to include appending the communication A→B into the table as a new record with a count "1".

In step S906, the count $C_{A \to B}$ of communications A→B and the count $C_{B \to A}$ of communications B→A are compared.

In step S908, it is determined whether $C_{A \to B}$ prevails over $C_{B \to A}$. In a case where $C_{A \to B}$ prevails over $C_{B \to A}$ ("Yes" in step S908), the method 900 proceeds to step S910 in which a temporary tree $T_{A \to B}$ is created. The temporary tree $T_{A \to B}$ denotes that node A is set as a parent node, and node B is set as a child node of A, indicating that node A depends on node B. The temporary tree may be used in the steps S922~S950 to determine whether the temporary tree may be added into the DAG so as to update the dependency in the DAG, which will be described subsequently.

In step S908, in a case where $C_{A \to B}$ does not prevail over $C_{B \to A}$ ("No" in step S908), the method 900 proceeds to step S912 in which it is further determined whether $C_{B \to A}$ prevails over $C_{A \to B}$.

In a case where $C_{B \to A}$ prevails over $C_{A \to B}$ ("Yes" in step S912), the method 900 proceeds to step S914 in which a temporary tree $T_{B \to A}$ is created. The temporary tree $T_{B \to A}$ denotes that node B is set as a parent node, and node A is set as a child node of node B, indicating that node B depends on node A.

In a case where $C_{B \to A}$ does not prevail over $C_{A \to B}$ ("No" in step S912), which means that $C_{A \to B}$ does not prevail over $C_{B \to A}$ and $C_{B \to A}$ does not prevail over $C_{A \to B}$, the method 900 proceeds to step S916. For example, if the criterion of determining whether $C_{A \to B}$ prevails over $C_{B \to A}$ is that whether $C_{A \to B}$ is larger than $C_{B \to A}$ (corresponding to the case that the predefined threshold N=1), the method 900 will proceed to step S916 in a case where $C_{A \to B} = C_{B \to A}$.

In step S916, it is determined whether an edge between A and B already exists in the DAG. In a case where an edge between A and B already exists in the DAG ("Yes" in step S916), the method 900 proceeds to step S918 in which a temporary tree is created based on the direction of the edge between A and B. For example, if the direction of the edge between A and B is from A to B (i.e., an edge $E_{A \to B}$ exists in the DAG), the temporary tree may be created as $T_{A \to B}$, and vice versa.

In a case where an edge between A and B does not exist in the DAG ("No" in step S916), the method 900 proceeds to step S920 in which a temporary tree is created based on the latest captured communication. For example, since the latest captured communication is the communication A captured in step S902, the temporary tree is created as $T_{A \to B}$.

Of course, if the latest captured communication is the communication B→A captured in step S902, the temporary tree is created as $T_{B \to A}$.

The temporary tree created in step S910, S914, S918 or S920 may be used in steps S922~S950 to determine whether the temporary tree may be added into the DAG so as to update the dependency between node A and node B in the DAG.

Specifically, in step S922, a temporary tree $T_{X \to Y}$ is present that was created in steps S902-S920, wherein X may correspond to node A while Y may correspond to node B, or X may correspond to node B while Y may correspond to node A, depending on the outcome from steps S902-S920.

In step S924, it is determined whether an edge $E_{X \to Y}$ exists in the DAG. The edge $E_{X \to Y}$ is a directed edge from node X to node Y in the DAG, which corresponds to a dependency indicating that node X depends on node Y.

In a case where the edge $E_{X \to Y}$ exists in the DAG ("Yes" in step S924), the method 900 proceeds to step S926 in which the edge $E_{X \to Y}$ is not updated, since the existing dependency expressed by the edge $E_{X \to Y}$ is the same as the dependency expressed by the temporary tree $T_{X \to Y}$.

In a case where the edge $E_{X \to Y}$ does not exist in the DAG ("No" in step S924), the method 900 proceeds to step S928 in which it is further determined whether an edge $E_{Y \to X}$ exists in the DAG.

In step S928, in a case where the edge $E_{Y \to X}$ exists in the DAG ("Yes" in step S928), it means that only edge $E_{Y \to X}$ exists in the DAG and edge $E_{X \to Y}$ does not exist in the DAG. In this case, it will be further determined whether using the temporary tree $T_{X \to Y}$ to replace the existing edge $E_{Y \to X}$ (in other words, reversing the edge $E_{Y \to X}$ into $E_{X \to Y}$) will cause a dependency cycle in the DAG. The determination is performed in steps S930~S940, wherein the steps S930, S934, S936, S938 and S940 may respectively correspond to steps S610, S620, S630, S640 and S650 described with reference to FIG. 6.

In step S930, it is further determined whether an indirect link $L_{Y \to X}$ exists in the DAG. The indirect link $L_{Y \to X}$ may be a consistently-directed sequence of edges starting at node Y and ending in node X via one or more intermediate nodes in the DAG, which represents a dependency chain from Y to X via the one or more intermediate nodes.

In a case where the indirect link $L_{Y \to X}$ does not exist in the DAG ("No" in step S930), it means that the temporary tree $T_{X \to Y}$ to be added into the DAG will not cause a dependency cycle, and thus the method 900 proceeds to step 932 in which it is determined to reverse $E_{Y \to X}$ into $E_{X \to Y}$. In other words, the temporary tree $T_{X \to Y}$ is added into the DAG to replace the existing dependency represented by the edge $E_{Y \to X}$.

In some embodiments, the reversing may be achieved by setting node X as a parent node of node Y. Further, the dependencies between node X and other nodes except for node Y and the dependencies between node Y and other nodes in the DAG except for node X are not changed.

Further, in a case where it is determined that the indirect link $L_{Y \to X}$ exists in the DAG ("Yes" in step S930), the method 900 proceeds to step S934 in which a count $C_{X \to Y}$ of communications X→Y is compared to a sum $S_{Y \to X}$ of counts of communications associated with the dependency chain from Y to X (represented by the indirect link $L_{Y \to X}$) via one or more inter mediate nodes.

In step S936, it is determined whether $C_{X \to Y}$ prevails over $S_{Y \to X}$ based on the comparison of step S934. In a case where it is determined that $C_{X \to Y}$ does not prevail over $S_{Y \to X}$ ("No" in step S936), the method 900 proceeds to step S938 in which it is determined not to update $E_{Y \to X}$ and maintain the edges in the indirect link $L_{Y \to X}$.

In a case where it is determined that $C_{X \to Y}$ prevails over $S_{Y \to X}$ ("Yes" in step S936), the method 900 proceeds to step S940 in which it is determined to reverse $E_{Y \to X}$ into $E_{X \to Y}$ and abandon the indirect link $L_{Y \to X}$.

The reversing may be achieved by the same method described with reference to step S932. Further, breaking the indirect link $L_{Y \to X}$ may be achieved by abandoning at least one of the edges in $L_{Y \to X}$ from the DAG. For example, an edge associated with a smallest count of communications in $L_{Y \to X}$ may be abandoned. Alternatively, it is also possible to abandon more than one edge with smallest counts of communications in $L_{Y \to X}$, or all the edges in $L_{Y \to X}$.

As an alternative to steps S934~S940, in a case where it is determined in step S930 that the indirect link $L_{Y \to X}$ exists in the DAG ("Yes" in step S930), at least one edge among the dependency cycle constituted by $E_{X \to Y}$ and $L_{Y \to X}$ may be abandoned to break the cycle. In some examples, an edge associated with a smallest count of communications in the dependency cycle constituted by $E_{X \to Y}$ and $L_{Y \to X}$ may be abandoned to break the cycle. Alternatively, more than one edge in the dependency cycle constituted by $E_{X \to Y}$ and $L_{Y \to X}$ may be abandoned to break the cycle.

Now refer back to step S928, in a case where the edge $E_{Y \to X}$ does not exist in the DAG ("No" in step S928), the method 900 proceeds to step S942. In this case, it means that neither the edge $E_{X \to Y}$ nor the edge $E_{Y \to X}$ exists in the DAG.

In step S942, it is determined whether both node X and node Y exist in the DAG. In a case where at least one of node X and node Y does not exist in the DAG ("No" in step S942), the method 900 proceeds to step S944.

In step S944, the at least one of node X and node Y which does not exist in the DAG is inserted into the DAG. Further, an edge $E_{X \to Y}$ is set in DAG.

In some embodiments, in step S944, in a case where only node X exists in the DAG, node Y is inserted into the DAG as a child node of node X. In a case where only node Y exists in the DAG, node X is inserted into the DAG as a parent node of node Y, and the root node is set as the parent node of node X. Further, in a case where neither node X nor node Y exists in the DAG, node X is inserted as a child node of the root node, and node Y is inserted as a child node of node X.

In step S942, in a case where it is determined that both node X and node Y exist in the DAG ("Yes" in step S942), it means that there is no direct dependency between node X and node Y in the DAG. The method 900 proceeds to step S946 to further determine whether an indirect link between X and Y exists in the DAG. The indirect link between node X and node Y may be either $L_{X \to Y}$ or $L_{Y \to X}$.

In a case where it is determined that there is no indirect link between node X and node Y ("No" in step S946), it means that adding the temporary tree $T_{X \to Y}$ into the DAG will not cause a dependency cycle in DAG. Therefore, the method 900 proceeds to step S950 in which an edge $E_{X \to Y}$ is set in the DAG. In some embodiments, setting an edge $E_{X \to Y}$ into the DAG may be achieved by setting node X as a parent node of node Y.

In a case where it is determined that there is an indirect link between node X and node Y ("Yes" in step S946), the method 900 proceeds to step S948 in which it is further determined whether an indirect link $L_{X \to Y}$ exists in the DAG.

In a case where it is determined that the indirect link $L_{X \to Y}$ exists in the DAG ("Yes" in step S948), the method 900 proceeds to step 950 in which an edge $E_{X \to Y}$ is set in the DAG, since adding the edge $E_{X \to Y}$ into the DAG will not cause a dependency cycle with the indirect link $L_{X \to Y}$.

In a case where it is determined that the indirect link $L_{X \to Y}$ does not exist in the DAG ("No" in step S948), it means that the indirect link $L_{Y \to X}$ exists in the DAG. In this case, the method 900 proceeds to step S934 to determine whether or not the edge $E_{X \to Y}$ is to be updated so as to avoid the dependency cycle constituted by the edge $E_{X \to Y}$ and the indirect link $L_{Y \to X}$. The following steps from step S934 to step S940 are the same as described above and are omitted here. Similarly, as an alternative to steps S934~S940, in a case where it is determined in step S948 that the indirect link $L_{X \to Y}$ does not exist in the DAG but $L_{Y \to X}$ exists in the DAG ("No" in step S948), at least one edge among the dependency cycle constituted by $E_{X \to Y}$ and $L_{Y \to X}$ may be abandoned to break the cycle.

The method 900 described above is exemplary implementation of determining the dependency using the DAG. It should be appreciated that many modifications and variations may be made to the method 900, so long as they meet the above described two rules, the one is to update the dependency based on the prevailing of $C_{A \to B}$ and $C_{B \to A}$, and the other is to avoid the dependency cycle in the DAG.

For example, the steps related to the temporary tree (steps S902~S922) may be omitted in method 900. Instead, the determining of the prevailing of $C_{A \to B}$ and $C_{B \to A}$ may be performed at a suitable timing during the steps S924~S950. For example, in step S928, if it is determined that the edge $E_{Y \to X}$ exists in the DAG, it may be further determined whether the count $C_{X \to Y}$ prevails over the count $C_{Y \to X}$. If the count $C_{X \to Y}$ prevails over the count $C_{Y \to X}$, the method 900 will proceed to step S930.

In some embodiments, all nodes in the network environment may be traversed to obtain the dependencies between any two of all the nodes using the method 900. By this means, the DAG may reflect all dependencies of nodes in the network environment.

In some embodiments, the DAG may be saved as a local file and be updated in response to a capture of a communication in the network environment. Further, the DAG may be reloaded by any node in the network environment to perform the method 900 to determine a dependency between the node and any other node in the network environment.

In some embodiments, if a node is removed from the network environment, the corresponding node in the DAG may be removed, and the child nodes of this node may be moved under the root node in the DAG.

In some embodiments, an operation of the first node and the second node may be performed based on the dependency determined according to some embodiments of the present disclosure. The operation may be any type of operation to be made to the first node and the second node in the network environment. For example, the operation may be maintenance (such as a reboot, an update, a shutdown), an incident handling, an addition or deletion of nodes from the network environment, or the like.

In a case where the determined dependency indicates that the first node depends on the second node, the operation of the first node may also depend on the operation of the second node. Therefore, in some embodiments, the operation of the second node may be operated prior to the first node. By this means, the operation of the first node may be performed normally since the operation of the second node is already performed, thus a system failure may be avoided.

An exemplary operation, i.e., a full reboot request of all nodes in the network environment will be described below.

The dependencies of all nodes in the network environment may be used to determine the order of reboot. For example, the DAG may be reloaded to obtain the dependencies of all the nodes in the network environment. The reboot may be performed sequentially from the leaf node to the root node based on the DAG. Further, if there is a node having no dependency with all other nodes in the network environment, it may be rebooted at any time during the reboot cycle without considering the order, since there is no dependency between this node to any other node in the network environment.

In some embodiments, a state of a node may also be recorded in association with the node. For example, a state of whether the node is active or inactive may be recorded to indicate whether the node is operating or not.

In some embodiments, the state of the node may be queried to determine whether an incident occurs in the network environment based on the dependency between the node and other nodes in the network environment. In a normal state, an inactive node may not be accessed by other nodes in the network environment, thus the inactive node may not be depended by other nodes. Therefore, in the normal state, for example, the inactive node may not have a parent node in the DAG. If a state of one node is inactive and the node has a parent node, it means that there may be some incident between the node and its parent node, which may be notified to the system admin of the network environment so as to handle the incident.

In some embodiments, the network environment may comprise a cloud environment. In the cloud environment, there may be a large amount of nodes, and the dependencies of the nodes may be complicated. Further, the dependencies may be generated dynamically and changed frequently. The method according to the present disclosure may be applied to the cloud environment to determine the dependencies dynamically, so as to obtain up-to-date dependencies of nodes in the cloud environment.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, there is provided a system. The system may comprise one or more processors and a memory coupled to at least one of the one or more processors. The system may further comprise a set of computer program instructions stored in the memory and executed by at least one of the one or more processors in order to perform an action of obtaining a character of first-direction communications and a character of second-direction communications in a network environment, the first-direction communications being network communications from a first node to a second node, and the second-direction communications being network communications from the second node to the first node. The system may further comprise a set of computer program instructions stored in the memory and executed by at least one of the one or more processors in order to perform an action of determining a dependency between the first node and the second node based on the character of first-direction communications and the character of second-direction communications, the dependency between the first node and the second node indicating whether the first node depends on the second node or the second node depends on the first node.

According to an embodiment of the present disclosure, there is provided a computer program product. The computer program product may comprise a computer readable storage medium having program instructions embodied therewith. The program instructions may be executable by a device to perform a method. The method may comprise obtaining a character of first-direction communications and a character of second-direction communications in a network environment, the first-direction communications being network communications from a first node to a second node, and the second-direction communications being network communications from the second node to the first node. The method may further comprise determining a dependency between the first node and the second node based on the character of first-direction communications and the character of second-direction communications, the dependency between the first node and the second node indicating whether the first node depends on the second node or the second node depends on the first node.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining node dependency comprising:
    obtaining, by a processor, a number of direct first-direction communications between a first node and a second node, and a number of direct second-direction communications between the second node and the first node, in a network environment, wherein the number of the direct first-direction communications and the number of the direct second-direction communications comprise a number of data transmissions, and wherein the obtaining comprises capturing the number of the direct first-direction communications and the number of the direct second-direction communications using virtual routing and forwarding and storing the number of the direct first-direction communications and the number of the direct second-direction communications in a table;
    comparing, by the processor, the number of the direct first-direction communications with respect to the number of the direct second-direction communications to determine whether the number of the direct first-direction communications is greater than, equal to, or less than the number of the direct second-direction communications and such that a margin of difference is determined;
    and
    determining, by the processor, a dependency between the first node and the second node based on results of the comparing and based on the margin of difference not being smaller than a pre-defined threshold number;
    wherein
        the dependency is represented by a Directed Acyclic Graph (DAG),
        the first node and the second node are represented as a first vertex and a second vertex in the DAG respectively, and
        the dependency indicating that the first node depends on the second node is represented as an edge directed from the first vertex to the second vertex in the DAG, or the dependency indicating that the second node depends on the first node is represented by an edge directed from the second vertex to the first vertex in the DAG.

2. The computer-implemented method according to claim 1, further comprising:

obtaining, by the processor, a number of total first-direction communications between a first node and a second node, and a number of total second-direction communications between the second node and the first node, in the network environment, wherein the number of the total first-direction communications and the number of the total second-direction communications comprise the number of data transmissions, wherein the number of the total first-direction communications and the number of the total second-direction communications comprise a sum of direct data transmissions and indirect data transmissions;

wherein the determining the dependency between the first node and the second node further comprises:

determining, by the processor, based on a relationship between the number of the total first-direction communications and the number of the total second-direction communications, whether the dependency between the first node and the second node is to be updated.

3. The computer-implemented method according to claim 2, wherein the determining whether the dependency between the first node and the second node is to be updated further comprises:

in a case where an existing dependency indicates that the second node depends on the first node, reversing, by the processor, the dependency between the second node and the first node if the number of the total first-direction communications prevails over the number of the total second-direction communications.

4. The computer-implemented method according to claim 3, wherein the number of the total first-direction communications prevails over the number of the total second-direction communications if the number of the total first-direction communications is larger than the number of the total second-direction communications by the margin which is not smaller than the pre-defined threshold number.

5. The computer-implemented method according to claim 2, wherein the determining whether the dependency between the first node and the second node is to be updated further comprises:

in a case where there is no existing dependency between the first node and the second node, setting a dependency to indicate that the first node depends on the second node if the number of the total first-direction communications prevails over the number of the total second-direction communications.

6. The computer-implemented method according to claim 2, wherein the determining whether the dependency between the first node and the second node is to be updated further comprises:

in a case where there is no existing dependency between the first node and the second node, setting, by the processor, a dependency to indicate that the first node depends on the second node if neither of the number of the total first-direction communications and the number of the total second-direction communications prevails over the other and if the latest communication is a first-direction communication.

7. The computer-implemented method according to claim 2, wherein the determining whether the dependency between the first node and the second node is to be updated avoids co-existence of the dependency indicating that the first node depends on the second node and a dependency chain indicating that the second node indirectly depends on the first node via one or more intermediate nodes.

8. The computer-implemented method according to claim 7, wherein the determining whether the dependency between the first node and the second node is to be updated further comprises:

if updating of the dependency will cause said co-existence, breaking, by the processor, a cycle of dependencies caused by said co-existence by abandoning at least one dependency among the cycle of dependencies.

9. The computer-implemented method according to claim 8, wherein the abandoned at least one dependency is associated with the smallest character of communications among the cycle of dependencies.

10. The computer-implemented method according to claim 7, wherein the determining whether the dependency between the first node and the second node is to be updated further comprises:

if updating of the dependency will cause said co-existence, comparing, by the processor, the number of the total first-direction communications with a sum of numbers of communications associated with the dependency chain from the second node to the first node via the one or more intermediate nodes; and determining not to update the dependency if the number of the total first-direction communications does not prevail over the sum of the numbers of communications associated with the dependency chain, or determining to update the dependency and to abandon at least one of the dependencies in the dependency chain if the number of the total first-direction communications prevails over the sum of the numbers of communications associated with the dependency chain.

11. The computer-implemented method according to claim 1, wherein the obtaining the number of direct first-direction communications and the number of direct second-direction communications further comprises:

increasing, by the processor, the number of direct first-direction communications by one in response to a capture of a direct first-direction communication; and the determining the dependency between the first node and the second node is based on the increased number of the direct first-direction communications and the number of the second-direction communications.

12. The computer-implemented method according to claim 1, further comprising:

performing, by the processor, an operation of the first node and the second node based on the determined dependency.

13. The computer-implemented method according to claim 1, wherein the network environment comprises a cloud environment.

14. A system for determining node dependency between multiple computers communicating via a communications network, the system comprising:

a computer system comprising, a processor, a computer readable storage medium, and program instructions stored on the computer readable storage medium being executable by the processor to cause the computer system to perform a method comprising:

obtaining a number of direct first-direction communications between a first node and a second node and a number of direct second-direction communications between the second node and the first node in a network environment, wherein the number of the direct first-direction communications and the number of the direct second-direction communications comprise the number of data transmissions, and wherein the obtaining comprises capturing the number of the direct first-direction communications and the number of the direct second-direction communications using virtual routing and forwarding and storing the number of the direct first-direction communications and the number of the direct second-direction communications in a table;

comparing the number of the direct first-direction communications with respect to the number of the direct second-direction communications to determine whether the number of the first-direction communications is greater than, equal to, or less than the number of the second-direction communications and such that a margin of difference is determined; and determining a dependency between the first node and the second node based on results of the comparing and based on the margin of difference not being smaller than a pre-defined threshold number;

wherein
the dependency is represented by a Directed Acyclic Graph (DAG),
the first node and the second node are represented as a first vertex and a second vertex in the DAG respectively, and
the dependency indicating that the first node depends on the second node is represented as an edge directed from the first vertex to the second vertex in the DAG, or the dependency indicating that the second node depends on the first node is represented by an edge directed from the second vertex to the first vertex in the DAG.

15. The system according to claim 14, wherein the method further comprises:

obtaining a number of total first-direction communications between a first node and a second node, and a number of total second-direction communications between the second node and the first node, in the network environment, wherein the number of the total first-direction communications and the number of the total second-direction communications comprise the number of data transmissions, wherein the number of the total first-direction communications and the number of the total second-direction communications comprise a sum of direct data transmissions and indirect data transmissions;

wherein the determining the dependency between the first node and the second node further comprises:

determining, based on a relationship between the number of the total first-direction communications and the number of the total second-direction communications, whether the dependency between the first node and the second node is to be updated.

16. The system according to claim 15, wherein the determining whether the dependency between the first node and the second node is to be updated avoids co-existence of the dependency indicating that the first node depends on the second node and a dependency chain indicating that the second node indirectly depends on the first node via one or more intermediate nodes.

17. A computer program product for determining node dependency between multiple computers communicating via a communications network, the computer program product comprising:

a computer-readable storage medium having program instructions embodied therewith, wherein the computer readable storage medium is not a transitory signal per se, the program instructions executable by a computer to cause the computer to perform a method comprising:

obtaining a number of direct first-direction communications between a first node and a second node and a number of direct second-direction communications between the second node and the first node, in a network environment, wherein the number of the direct first-direction communications and the number of the direct second-direction communications comprises the number of data transmissions, and wherein the obtaining comprises capturing the number of the direct first-direction communications and the number of the direct second-direction communications using virtual routing and forwarding and storing the number of the direct first-direction communications and the direct number of the second-direction communications in a table;

comparing the number of the direct first-direction communications with respect to the number of the direct second-direction communications to determine whether the number of the first-direction communications is greater than, equal to, or less than the number of the second-direction communications and such that a margin of difference is determined; and determining a dependency between the first node and the second node based on results of the comparing and based on the margin of difference not being smaller than a pre-defined threshold number;

wherein
the dependency is represented by a Directed Acyclic Graph (DAG),
the first node and the second node are represented as a first vertex and a second vertex in the DAG respectively, and
the dependency indicating that the first node depends on the second node is represented as an edge directed from the first vertex to the second vertex in the DAG, or the dependency indicating that the second node depends on the first node is represented by an edge directed from the second vertex to the first vertex in the DAG.

18. The computer program product according to claim 17, wherein the method further comprises:

obtaining a number of total first-direction communications between a first node and a second node, and a number of total second-direction communications between the second node and the first node, in the network environment, wherein the number of the total first-direction communications and the number of the total second-direction communications comprise the number of data transmissions, wherein the number of the total first-direction communications and the number of the total second-direction communications comprise a sum of direct data transmissions and indirect data transmissions;

wherein the determining the dependency between the first node and the second node further comprises:

determining, based on a relationship between the number of the total first-direction communications and the number of the total second-direction communications, whether the dependency between the first node and the second node is to be updated.

19. The computer program product according to claim 18, wherein the determining whether the dependency between the first node and the second node is to be updated avoids co-existence of the dependency indicating that the first node depends on the second node and a dependency chain indicating that the second node indirectly depends on the first node via one or more intermediate nodes.

* * * * *